United States Patent [19]

Sbuelz

[11] 4,285,057
[45] Aug. 18, 1981

[54] SAMPLING GATE FOR TDM TELECOMMUNICATION SYSTEM

[75] Inventor: Anes Sbuelz, Milan, Italy

[73] Assignee: Societa Italiana Telecomunicazioni Siemens S.p.A., Milan, Italy

[21] Appl. No.: 105,878

[22] Filed: Dec. 21, 1979

[30] Foreign Application Priority Data

Dec. 22, 1978 [IT] Italy ................................. 31257 A/78

[51] Int. Cl.³ ........................ H04J 3/02; H03K 17/00
[52] U.S. Cl. .................................. 370/112; 307/243; 307/254
[58] Field of Search ............................ 370/112, 51, 6; 307/243, 244, 254

[56] References Cited

U.S. PATENT DOCUMENTS

| | | | |
|---|---|---|---|
| 3,621,288 | 11/1971 | Brown | 307/243 |
| 3,969,638 | 7/1976 | Marchetti et al. | 370/112 |

FOREIGN PATENT DOCUMENTS

| | | | |
|---|---|---|---|
| 1067188 | 11/1979 | Canada | 370/66 |
| 1501421 | 2/1978 | United Kingdom | 370/66 |

OTHER PUBLICATIONS

"Principles of Pulse Code Modulation" by Catterhole, London, Iliffe Books Ltd., (1969), pp. 30–33.

Primary Examiner—Douglas W. Olms
Attorney, Agent, or Firm—Karl F. Ross

[57] ABSTRACT

A sampling gate of a TDM telephone system, designed to connect a subscriber station to a trunk line during an allocated time slot, comprises a pair of bucking transistors of the same conductivity type (NPN) inserted between a live wire from the station and a corresponding "hot" conductor of the trunk line whose "cold" conductor, tied to the reference wire of the subscriber line, is grounded through an elevated resistance. During the allocated time slot, the two bucking transistors are rendered conductive by a timing pulse applied across their base/emitter circuits via a transformer while a connection leading from their bases to negative biasing potential is temporarily severed by an interposed FET which is cut off by the timing pulse applied to its gate electrode via a differentiation circuit.

6 Claims, 4 Drawing Figures

SAMPLING GATE FOR TDM TELECOMMUNICATION SYSTEM

FIELD OF THE INVENTION

My present invention relates to a sampling gate as used in a telephone or other telecommunication system of the time-division-multiplex (TDM) type for connecting, during an allocated time slot, a live or active wire of a two-wire subscriber line to a so-called "hot" conductor of a trunk line whose "cold" conductor is tied to the passive or reference wire of the subscriber line.

BACKGROUND OF THE INVENTION

A sampling gate of this type, particularly designed for the transmission of voice samples in a TDM telephone system operating with pulse-amplitude modulation (PAM) and using resonant transfer (see commonly owned U.S. Pat. No. 3,499,199), may comprise a pair of junction transistors of the same conductivity type (NPN OR PNP) inserted in bucking relationship, with their emitters and their bases directly interconnected, between the live local wire and the hot trunk conductor. An electronic switch constituted by such a transistor pair has been described in an article by K. W. Cattermole, IEEE publication of September 1958, entitled "Efficiency and Reciprocity in Pulse-Amplitude Modulation"; see also a book by the same author entitled "Principles of Pulse-Code Modulation", published 1969 by ILIFFE Books Limited, London. Reference in this connection may further be made to commonly owned Italian Pat. No. 1,014,576 and to the corresponding British Pat. No. 1,501,421 and Canadian Pat. No. 1,067,188.

According to the aforementioned commonly owned patents, the suppression of cross-talk in such a TDM/PAM telephone system is facilitated by the use of a trunk line in the form of a coaxial cable whose conductors have a thickness less than the penetration depth of the alternating signal currents, thereby reducing the intensity of parasitic currents traversing these conductors. Such a coaxial cable is also disclosed in commonly owned U.S. Pat. Nos. 3,878,485 and 3,973,227. I have found, however, that the increased resistance of the coaxial cable due to the small thickness of its conductors results in another source of cross-talk, namely an enhanced leakage current passing through the usually grounded cold conductor of the trunk line and the common power supply serving for the energization of the associated local lines.

OBJECT OF THE INVENTION

The object of my present invention, therefore, is to provide an improved sampling gate for a telecommunication system of the type referred to which substantially suppresses the cross-talk due to the last-mentioned leakage current.

SUMMARY OF THE INVENTION

A sampling gate according to my invention, in which two junction transistors are inserted in the aforedescribed manner between an active or live wire of a subscriber line and a first (hot) conductor of an associated trunk line, comprises electronic switch means—preferably in the form of a field-effect transistor—normally connecting the interconnected bases of the junction transistors to a supply of biasing potential designed to cut off these transistors in the absence of a timing pulse generated during the allocated time slot. This timing pulse is applied on the one hand to the input circuit of the junction transistors, advantageously via a primary winding of a coupling transformer having a secondary winding connected across their emitters and bases, and on the other hand—preferably through an intensity-increasing differentiation circuit—to the electronic switch means for disconnecting the bases of the junction transistors from the supply of biasing potential during the allocated time slot when message samples can be exchanged between the intercommunicating subscriber stations.

In order to suppress the leakage current through the common power supply, I further provide first resistance means in series with the electronic switch means and second resistance means connecting the power supply to the second (cold) conductor of the trunk line and thus also to the passive or reference wire of the subscriber line. Finally, I provide capacitive means establishing a low-impedance path for incoming message samples between the second trunk conductor and the transistor bases in the absence of a timing pulse, i.e. in the off-period of the sampling gate, this path passing through the conducting electronic switch means.

BRIEF DESCRIPTION OF THE DRAWING

The above and other features of my present invention will now be described in detail with reference to the accompanying drawing in which.

SPECIFIC DESCRIPTION

Figure 1:
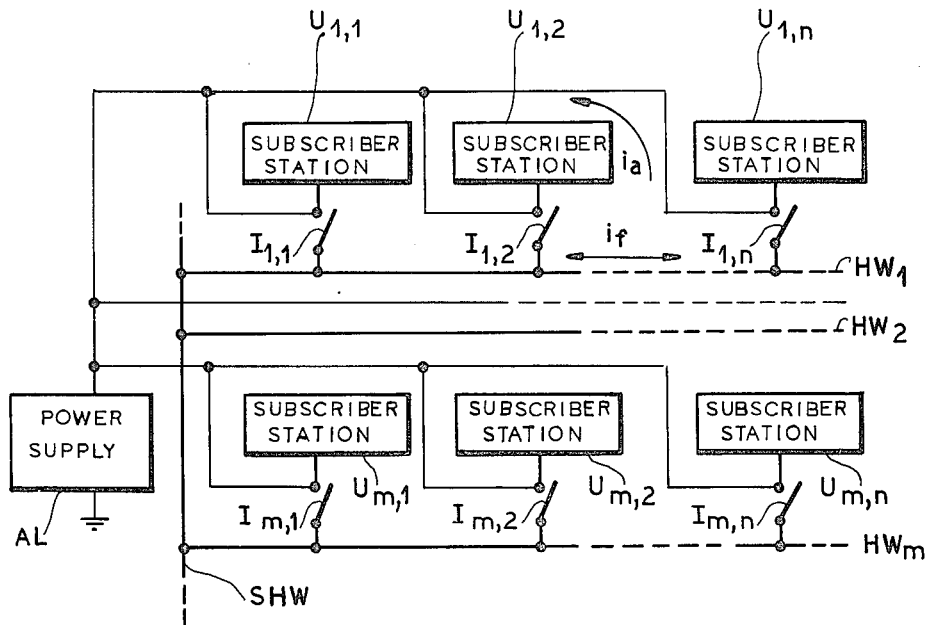
FIG. 1 is a block diagram showing a representative portion of a TDM/PAM telephone system with sampling gates embodying my invention.

In FIG. 1 I have schematically illustrated a telephone system with a multiplicity of subscriber stations $U_{1,1}$, $U_{1,2}, \ldots U_{1,n}, \ldots U_{m,1}, U_{m,2}, \ldots U_{m,n}$. These subscriber stations, all energized from a common power supply AL, are selectively connectable to one another by way of trunk lines including a main trunk or superhighway SHW and branch trunks or highways $HW_1$, $HW_2, \ldots HW_m$. Each subscriber station is provided with an electronic sampling gate (here symbolized by a pair of normally open contacts) $I_{1,1}, I_{1,2}, \ldots I_{1,n}, I_{m,1}, I_{m,2}, \ldots I_{m,n}$. Closure of any two of these contact pairs, under the control of timing pulses generated in the well-known manner by nonillustrated terminal equipment, establishes a conversation path between a calling and a called subscriber.

If, for example, contacts $I_{1,2}$ and $I_{1,n}$ are closed, voice samples pass in the form of an alternating current $i_t$ between subscriber stations $U_{1,2}$ and $U_{1,n}$ while a leakage current $i_a$ tends to circulate through the associated supply connection and thus to falsify the voice samples waiting to be discharged during subsequent time slots from storage capacitors of other subscriber stations. The transmission of the voice samples is assumed to occur by the resonant-transfer technique as described in the aforementioned U.S. Pat. No. 3,499,119.

Figure 2:
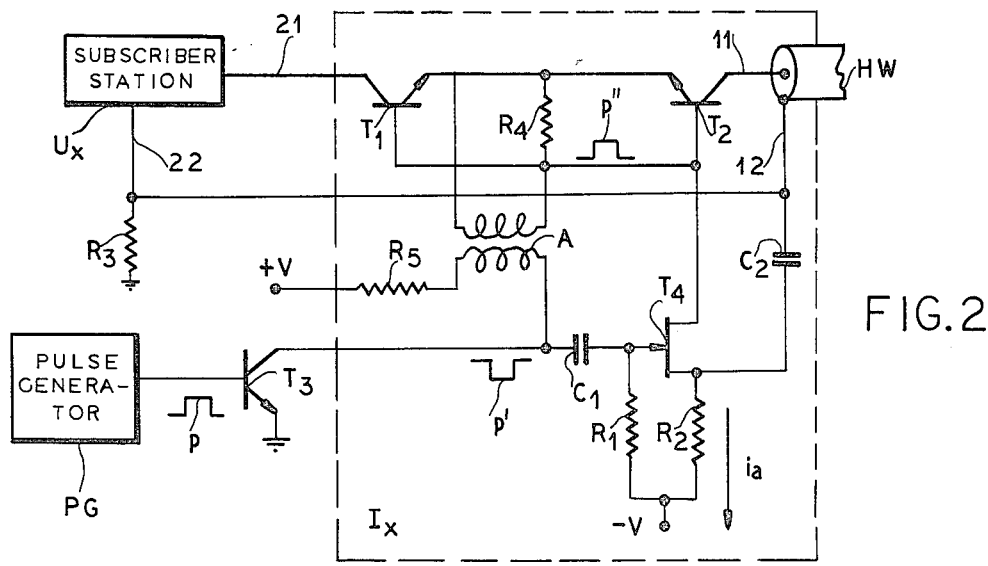
FIG. 2 is a detailed circuit diagram of a sampling gate included in the system of FIG. 1.

FIG. 2 shows details of a generic sampling gate $I_x$ designed to suppress the leakage current $i_a$ indicated in FIG. 1. This sampling gate comprises two NPN transistors $T_1$ and $T_2$ inserted in bucking relationship between a live wire 21 of a local subscriber line, emanating from a generic station $U_x$, and the hot or central conductor 11 of a coaxial cable HW generically representing the associated trunk line. The outer or cold conductor 12 of cable HW is directly tied to the passive or reference wire 22 of the subscriber line.

A pulse generator PG emits, during time slots allocated to subscriber station $U_x$, timing pulses p of positive polarity turning on a normally nonconductive NPN transistor $T_3$ whereby a current pulse p′ passes through the primary of a coupling transformer A in series with this transistor whose collector is connected through a resistor $R_5$ to a supply terminal carrying positive voltage $+V$. The secondary of transformer A is connected, in parallel with a biasing resistor $R_4$, across the interconnected bases and the interconnected emitters of transistors $T_1$ and $T_2$ to generate a pulse p″ of such polarity as to render these transistors momentarily conductive, allowing the resonant transfer of voice samples between subscriber station $U_x$ and a similar station reached via trunk line HW. The interconnected bases of transistors $T_1$ and $T_2$ are further tied to a drain electrode of an n-channel field-effect transistor $T_4$ whose source electrode is connected to a supply terminal of negative voltage $-V$ through a large resistor $R_2$ of several KΩ. The source electrode of the FET is also coupled, via a capacitor $C_2$, to the interconnected leads 12 and 22; these leads, in turn, are grounded through a resistor $R_3$ of similar large magnitude. Circuit $C_2$, $R_3$ produces a reference potential for leads 12 and 22.

The collector of control transistor $T_3$ is further coupled to the gate electrode of FET $T_4$ by way of a differentiation circuit comprising a series capacitor $C_1$ and a shunt resistor $R_1$. In the absence of a timing pulse p, the gate electrode of the FET is biased by supply voltage $-V$ via resistor $R_1$ to substantially the same potential as its source electrode whereby its resistance is low, this state corresponding to closure of the electronic switch constituted by the FET. Capacitor $C_2$ has a low impedance for the frequency spectrum of the voice samples subjected to resonant transfer whereby a shunt path is established between the bases of transistors $T_1$, $T_2$ and return conductor 12 during the off-period of sampling gate $I_x$ for incoming voice samples that may be transmitted to these bases in the cut-off state of the two transistors.

During the allocated time slot, the appearance of a pulse p not only saturates the series transistors $T_1$ and $T_2$ but also cuts off the FET $T_4$ to block the aforementioned shunt path while allowing resonant transfer of voice samples between the communicating subscribers by way of leads 11 and 21.

Figure 3A:
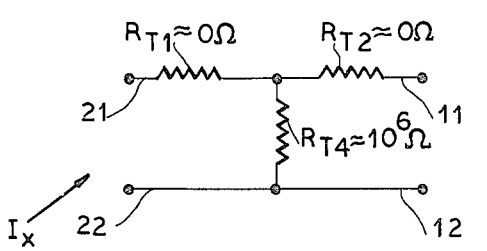
FIGS. 3A and 3B are equivalent circuits for the sampling gate of FIG. 2, showing its current paths in the presence and in the absence of a timing pulse.
Figure 3B:
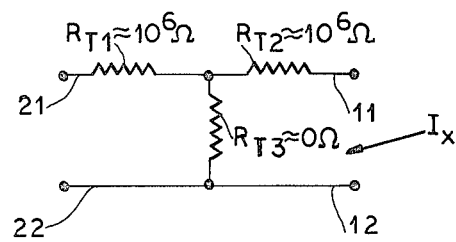

In FIGS. 3A and 3B the sampling gate $I_x$ has been schematically depicted as a T-network essentially composed of two series resistances $R_{T1}$, $R_{T2}$ and a shunt resistance $R_{T4}$. In FIG. 3A, which applies to the conductive state just discussed, series resistances $R_{T1}$ and $R_{T2}$ are virtually zero whereas shunt resistance $R_{T4}$ is high, having a magnitude of $10^6$ Ω in this particular instance. FIG. 3B, conversely, shows the open-circuit state where the series resistances $R_{T1}$ and $R_{T2}$ have the high value of $10^6$ Ω whereas the shunt resistance $R_{T4}$ is virtually zero.

For voice samples the resistors $R_2$ and $R_3$ are practically in parallel with each other. I have found that, for effectively decoupling the subscriber line from the power supply AL to suppress the aforedescribed leakage current $i_a$, the resistance constituted by the parallel combination of resistors $R_2$ and $R_3$ should be about $10^4$ to $10^6$ times as high as the resistance of the cold conductor 12 of cable HW. As shown in FIG. 1, power supply AL (generating the voltages $+V$ and $-V$) has a grounded terminal and is thus directly connected to the isolating resistor $R_3$.

I claim:

1. In a telecommunication system in which a plurality of subscriber lines each having a live wire and a reference wire are provided with individual sampling gates controlled by timing pulses enabling the exchange of message samples, during a time slot allocated to a given subscriber line, between the live wire thereof and a first conductor of a common trunk line having a second conductor connected to the reference wires of said subscriber lines, the improvement wherein said sampling gate comprises:

a pair of junction transistors of like conductivity type serially inserted in bucking relationship between said first conductor and the live wire of the associated subscriber line, said junction transistors being provided with interconnected bases and emitters forming part of an input circuit thereof coupled to a generator of said timing pulses;

electronic switch means normally connecting said bases to a supply of biasing potential cutting off said junction transistors, said electronic switch means being coupled to said generator for disconnecting said bases from said supply in the presence of timing pulses whereby said junction transistors conduct during an allocated time slot;

first resistance means in series with said electronic switch means;

second resistance means connecting said supply to said second conductor; and capacitive means establishing a low-impedance path for incoming message samples between said second conductor and said bases via said electronic switch means in the absence of timing pulses.

2. A telecommunication system as defined in claim 1 wherein said electronic switch means comprises a field-effect transistor.

3. A telecommunication system as defined in claim 2 wherein said field-effect transistor has a drain electrode connected to said bases, a source electrode connected by way of said first resistance means to said supply and by way of said capacitive means to said second conductor, and a gate electrode coupled to said generator through a differentiation circuit.

4. A telecommunication system as defined in claim 1, 2 or 3 wherein said generator is coupled to said input circuit through a primary winding of a transformer having a secondary winding connected across said emitters and bases.

5. A telecommunication system as defined in claim 1, 2 or 3 wherein said first and second resistance means have a combined resistance substantially higher than the resistance of said second conductor.

6. A telecommunication system as defined in claim 5 wherein said first and second conductors are an inner and an outer conductor of a coaxial cable.

* * * * *